United States Patent
Loponen et al.

(10) Patent No.: US 12,495,816 B2
(45) Date of Patent: Dec. 16, 2025

(54) TEXTURISED FOOD PRODUCT COMPRISING DESTARCHED OATS AND METHOD FOR PRODUCING IT

(71) Applicant: Oy Karl Fazer Ab, Helsinki (FI)

(72) Inventors: Jussi Loponen, Helsinki (FI); Juhani Sibakov, Helsinki (FI); Markku Mikola, Helsinki (FI); Tuula Laukkanen, Helsinki (FI); Katariina Rommi, Helsinki (FI); Janne Räsänen, Helsinki (FI); Miia Viinamäki, Helsinki (FI); Liisa Joas, Helsinki (FI)

(73) Assignee: Oy Karl Fazer Ab, Helsinki (FI)

( * ) Notice: Subject to any disclaimer, the term of this patent is extended or adjusted under 35 U.S.C. 154(b) by 742 days.

(21) Appl. No.: 17/614,347

(22) PCT Filed: Jun. 1, 2020

(86) PCT No.: PCT/FI2020/050374
§ 371 (c)(1),
(2) Date: Nov. 25, 2021

(87) PCT Pub. No.: WO2020/240095
PCT Pub. Date: Dec. 3, 2020

(65) Prior Publication Data
US 2022/0217997 A1    Jul. 14, 2022

(30) Foreign Application Priority Data
May 31, 2019 (FI) ........................ 20195456

(51) Int. Cl.
*A23J 3/22* (2006.01)
*A23J 3/14* (2006.01)
(Continued)

(52) U.S. Cl.
CPC .............. *A23J 3/227* (2013.01); *A23J 3/14* (2013.01); *A23J 3/26* (2013.01); *A23L 7/109* (2016.08); *A23P 30/25* (2016.08); *A23V 2002/00* (2013.01)

(58) Field of Classification Search
CPC . A23L 33/185; A23L 7/109; A23J 3/14; A23J 3/227; A23J 3/26; A23P 30/25
See application file for complete search history.

(56) References Cited

U.S. PATENT DOCUMENTS

| 5,061,497 A | 10/1991 | Thacker et al. |
| 2006/0286279 A1 | 12/2006 | Eastman et al. |

(Continued)

FOREIGN PATENT DOCUMENTS

| CN | 107307246 A | * 11/2017 | .............. A23J 1/125 |
| CN | 108471778 A | 8/2018 | |

(Continued)

OTHER PUBLICATIONS

CN 107307246 A Abstract, claims machine translation (Year: 2017).*

(Continued)

*Primary Examiner* — Vera Stuli
(74) *Attorney, Agent, or Firm* — Laine IP Oy

(57) ABSTRACT

According to an example aspect of the present invention there is provided a method for producing food products, which comprise destarched oats, together with at least one other plant protein product, at least one starch component, or both. The method of the invention comprises cooking a mixture comprising destarched oats using hydrothermal cooking or extrusion cooking. The invention also relates to the use of destarched oats in the manufacture of food products and to food products comprising destarched oats.

14 Claims, 1 Drawing Sheet

(51) Int. Cl.
  *A23J 3/26* (2006.01)
  *A23L 7/109* (2016.01)
  *A23P 30/25* (2016.01)

(56) References Cited

U.S. PATENT DOCUMENTS

2009/0317530 A1* 12/2009 Rotem ............... A23L 11/07
                                              426/507
2013/0183404 A1*  7/2013 Whalen ............... A23L 29/30
                                              426/18

FOREIGN PATENT DOCUMENTS

| JP | 2015231350 A | 12/2015 |
| JP | 2016082927 A | 5/2016 |
| WO | WO02067698 A1 | 9/2002 |
| WO | WO2010140963 A2 | 12/2010 |
| WO | WO2011053786 A2 | 5/2011 |
| WO | WO2013066197 A1 | 5/2013 |
| WO | WO2017064172 A1 | 4/2017 |
| WO | WO2017093538 A1 | 6/2017 |
| WO | WO2018019866 A1 | 2/2018 |
| WO | WO2018050863 A1 | 3/2018 |
| WO | WO2018115595 A1 | 6/2018 |
| WO | WO2018189161 A1 | 10/2018 |
| WO | WO2018219866 A1 | 12/2018 |

OTHER PUBLICATIONS soyinfocenter.com (History of Modern Soy Protein Ingredients—Isolates, Concentrates, and Textured Soy Protein Products (1911-2016) published Jan. 17, 2016 https://www.soyinfocenter.com/books/190). (Year: 2016).*
Jacques-Fajardo et al: Physical and hydration properties of expanded extrudates from a blue corn yellow pea and oat bran blend. LWT—Food Science and Technology, 2017, vol. 84, pp. 804-814.
Äikää: Alternative use of Okara. Theseus, 2018.
Äikää: Alternative use of Okara. Turku University of Applied Sciences, 2018.
Äikää: Okaran vaihtoehtoinen käyttö. Theseus, 2018.
Äikää: Okaran vaihtoehtoinen käyttö. Turun Ammattikorkeakoulu, 2018.

* cited by examiner

TEXTURISED FOOD PRODUCT COMPRISING DESTARCHED OATS AND METHOD FOR PRODUCING IT

FIELD

The present invention relates to the field of food technology, in particular to a method for producing texturized food products, which comprise destarched oats together with at least one other plant protein product, at least one starch component other than oat starch, or both. The method of the invention comprises cooking a mixture comprising destarched oats using hydrothermal cooking or extrusion cooking. The invention also relates to the use of destarched oats in the manufacture of texturized food products and to texturized food products comprising destarched oats.

BACKGROUND

Oat or oats (*Avena sativa*) is a species of cereal grain associated with various health benefits. The beneficial effects of oat are linked to reduction of blood cholesterol levels, reduction of blood glucose rise, and gut health. Compared to other cereals, oat contains more fat, protein, and soluble fibre, and is especially rich in β-glucan. The major storage proteins in oats are globulins, while prolamins constitute minor proteins of oat. Oats typically contains 55-70% starch on a dry matter basis.

Recently, consumption of oats has increased remarkably. In addition to above mentioned health benefits, this may be due to the fact that compared to other grains oats is well-tolerated, even by those having celiac disease. A variety of new oat based food products have also been developed, including oat based meat substitutes, oat based beverages and oat milk, the production of which has increased rapidly.

Oat milk or oat drink is produced by a process, wherein milled oat grains are soaked to extract their nutrients. The liquid fraction is separated from the solid by-product or residual fraction for example by filtration or centrifugation.

The solid by-product or residual fraction from oat milk production is a protein and fiber rich fraction, which is nowadays used mainly in the production of animal feeds or energy. In the manufacture of oat milk, approximately 50-200 g (wet weight) of the above mentioned solid residual fraction or by-product is produced per 1 L of oat milk. Typically the residual fraction from oat milk production has a dry matter content of 15-50% and a very low content of starch compared to wholegrain oats.

Several vegetable-based, high-protein food products have entered the market in recent years, including the above mentioned oat based meat substitutes. Many of these products are based on legume proteins or a combination of legume proteins and grain material, such as oats. For example, WO 2017/064172 A1 discloses texturized food products comprising legume protein, oat protein and oat bran. WO 2018/115595 A1 describes a process for manufacturing a plant based protein product, wherein the product comprises oat flour, potato protein, and calcium alginate, optionally together with a native casein concentrate. WO 2018/189161 A1 relates to ready-to-eat texturized protein products, comprising legume protein and cereal material and at most 55 weight % of carbohydrates.

Various methods for fractionation of cereals have also been disclosed. Thus WO 2018/19866 A1 relates to a method for preparation of cereal fractions by a dry and a subsequent wet process, wherein the process may further comprise steps of isolating a starch enriched fraction, a protein enriched fraction, and optionally a fiber enriched sub fraction. WO 02/067698 A1 discloses a process for the fractionation of cereal brans by a combination of enzymatic treatment and wet milling, followed by sequential centrifugation and ultrafiltration.

Texturized food products based solely on oat components have been disclosed in WO 2010/140963 A2, wherein a mixture comprising oat flour, oat dietary fibre, oat protein and oat oil is cooked in an extruder cooker and extruded to form an expanded food product. Also WO 2017/093538 A1 relates to extruded oat-based products and to a process for their manufacture, wherein a dry mix containing a high content of oat component was cooked-extruded with relatively low water.

However, there is still a continuous need for plant-based food products, for example meat substitutes, which would have desired sensory and nutritional properties as well as a good taste, while also being suitable for cooking, boiling and frying. Moreover, it would be advantageous to find new high-value uses to various fractions of oats, including the residual fraction from oat milk production, which is nowadays used mainly in animal feeds.

SUMMARY OF THE INVENTION

The invention is defined by the features of the independent claims. Some specific embodiments are defined in the dependent claims.

The present invention is based on the concept of using destarched oats in combination with other plant proteins or in combination with starch components other than oat starch, or in combination with both, in the manufacture of various food products, in particular texturized food products. In the process for producing said food products, pressure, shear forces, and changes in temperature during cooking produce a desired structure of a mixture that comprises destarched oats.

According to a first aspect of the present invention, there is thus provided a method for producing a texturized food product, wherein the method comprises the steps of providing destarched oats; mixing said destarched oats with a) at least one other plant protein product to obtain a mixture of destarched oats and at least one other plant protein, or b) at least one plant starch other than oat starch to obtain a mixture of destarched oats and non-oat starch; or c) at least one other plant protein product and at least one plant starch other than oat starch to obtain a mixture of destarched oats, at least one other plant protein product and non-oat starch; and cooking the mixture by using hydrothermal cooking or extrusion cooking to form the texturized food product.

According to a second aspect of the present invention, there is provided a texturized food product comprising destarched oat fraction having a residual starch content of 10% or less, preferably 6% or less, based on dry matter, together with at least one other plant protein product, or with at least one starch component other than oat starch, or with both.

According to a further aspect of the present invention, there is provided the use of destarched oats, particularly an oat fraction having a starch content of 10% or less, based on dry matter, together with at least one other plant protein, at least one starch component other than oat starch, or both, in the manufacture of texturized food products.

In embodiments of the invention, the destarched oats comprises or is a fraction of oats having a protein content of at least 20%, preferably at least 30%, more preferably at least 40%, based on dry matter. Typically the destarched oat fraction has a fiber content of at least 5%, preferably at least 10%, more preferably at least 15%, based on dry matter. In embodiments of the invention, the destarched oats or the destarched oat fraction consists or consists essentially of a residue fraction or by-product from production of oat milk, oat beverages or a liquid oat base.

Considerable advantages are obtained by the invention. First, the method provides a variety of plant-based food products, preferably textured food products, such as meat substitutes having a desirable fibrous structure, or extrudate food products and puffed extrudates, which can be used as ready-to-eat snacks, breakfast cereals, or pasta products.

Thus in one embodiment of the invention a meat-like fibril structure is produced from a mixture comprising destarched oats and other plant proteins by extrusion cooking. The process provides a moist or dry, cohesive food product with a fibrous structure, which is ready to be used as such or in the manufacture of for example meat analogs or various ready-to-eat meals. The structure of the meat substitute of the present invention is considered better in terms of appearance and mouthfeel (fibrous texture, juiciness) than the structure obtained based on the combination of plant proteins and the previously used starch-containing oat fractions.

In another embodiment of the invention, puffed extrudates are produced from a mixture comprising destarched oats and at least one non-oat starch by dry extrusion. The method of the invention provides puffed extrudates, protein texturates or snacks with a desired crispy and porous structure and sensory characteristics, as well as various pasta products.

Further, the method provides use for oat fractions, which typically are not utilized in the manufacture of food products. Particularly in an embodiment of the invention wherein destarched oats consists essentially of or is a by-product or residue fraction from the production of oat milk or oat beverages, the invention provides a new high-value use to a by-product, which was previously either discarded or used in the manufacture of animal feeds.

Still further, the method provides the production of oat containing meat analogue products having a considerably low carbohydrate content.

Further features and advantages of the present technology will appear from the following description of some embodiments.

EMBODIMENTS

Definitions

Figure 1:
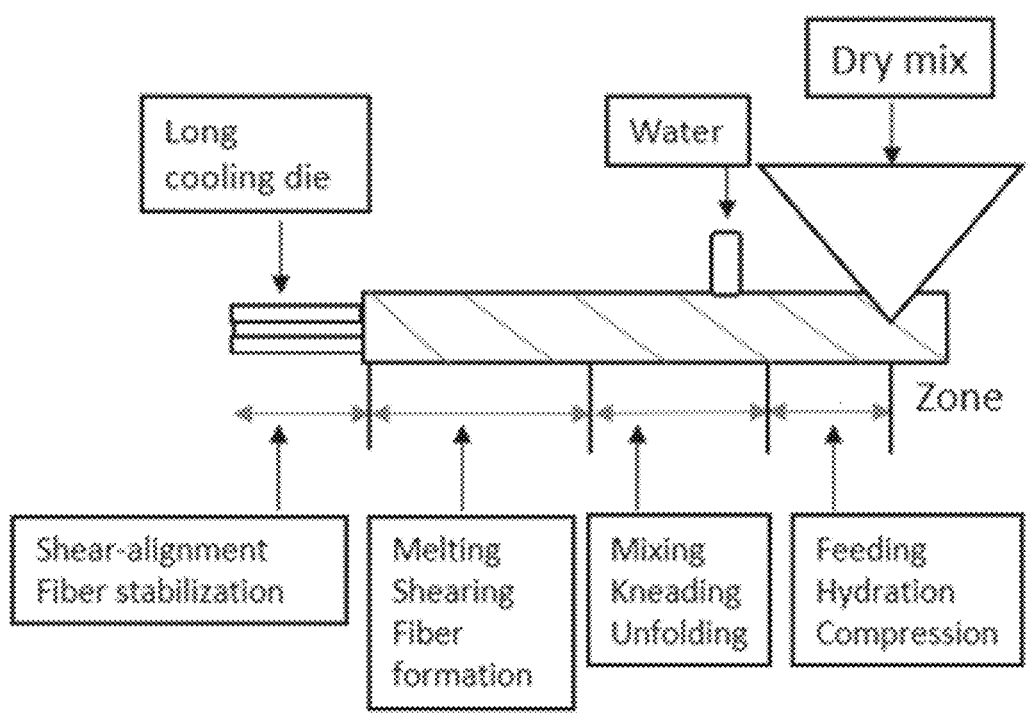
FIG. 1 illustrates a simplified scheme of a twin-screw extruder for high-moisture extrusion.

In the present context, the term "food product" refers to food products intended for human consumption, in particular to food products prepared by cooking, such as extrusion cooking and hydrothermal cooking or pressure cooking. The term includes both texturized and non-texturized food products.

"Textured food" or "texturized food" includes food products manufactured from various nutritional components made to resemble conventional foods in texture such as meat, seafood, or poultry, as well as pasta products, expanded snacks, cereals, protein texturates and the like. The manufacturing process of textured food often includes extrusion. However, textured food may also be manufactured by processes wherein temperature and pressure without extrusion are involved, such as hydrothermal cooking or pressure cooking.

"Oat fraction" or "fraction of oats" refers to any fraction of oats obtainable from oat processing or oat milling. Typically oat contains 55-70% starch on a dry matter basis.

In the present context, "destarched oats" consists or consists essentially of an oat fraction having a starch content of 10% or less, preferably 6% or less, more preferably 4% or less, even more preferably 3% or less, based on dry matter. Preferably, the destarched oats for the purposes of the present invention is the by-product or residual fraction from the production of oat milk, oat beverages or liquid oat base, but any other oat fraction having the above mentioned starch content is also applicable.

"Other plant protein products" include but are not limited to protein products based on wheat, rice, potato, pea, soy, bean, faba bean, chickpea, lentil, algae, gluten, lupine, canola, sunflower seed, hemp and their combinations. In embodiment, said at least one other plant protein product is other than oat protein.

"Plant starch other than oat starch" or "starch component other than oat starch" includes but is not limited to barley starch, rice starch, corn starch, potato starch, wheat starch, cassava starch, pea starch, faba bean starch, and rye endosperm starch.

"Cooking" includes but is not limited to extrusion-cooking, hydrothermal cooking or pressure cooking, particularly extrusion-cooking. Extrusion-cooking comprises dry extrusion and wet extrusion or high-moisture extrusion.

The invention is based on the finding that destarched oats in combination with at least one other plant protein product or at least one other starch component other than oat starch is an excellent raw material for producing various textured food products using a cooking process, such as extrusion-cooking or hydrothermal cooking. For example, the method provides texturized, meat-like products having a desirable fibrous structure, as well as other food products, such as expanded snacks or cereals and pasta products. The structure of the food products can be adjusted by varying the ingredients and their amounts and by selecting a suitable cooking process and its parameters.

According to the invention, the method for producing a texturized product comprises the steps of providing destarched oats; mixing said destarched oats with at least one other plant protein product to obtain a mixture of destarched oats and plant proteins, or mixing said destarched oats with at least one starch component other than oat starch, or mixing said destarched oats with both at least one other plant protein product and non-oat starch; and cooking the obtained mixture by using hydrothermal cooking or extrusion cooking to form the texturized food product.

In an embodiment, the destarched oats is or consists essentially of a fraction of oats having a starch content of 10% or less, preferably 6% or less, more preferably 4% or less, even more preferably 3% or less, based on dry matter. Preferably, the destarched oats is an oat fraction having a protein content of at least 20%, preferably at least 30%, more preferably at least 40%, based on dry matter. The fiber content of the destarched oat fraction is typically at least 5%, preferably at least 10%, more preferably at least 15%, based on dry matter.

In a further embodiment, the destarched oats for the purposes of the present invention is the by-product or residual fraction from the production of oat milk or oat beverages or a by-product or residual fraction from the production of liquid oat base which can be used for the production of various oat-based food products. However, any other oat fraction having the above mentioned starch content is applicable.

A residue fraction or by-product from the production of oat milk or oat beverages typically has a dry matter content of 15-50% (wet destarched oats) or 90-97% (dry destarched oats). Dry destarched oats is typically obtained by flash-drying or milldrying wet destarched oats or the residual fraction from the production of oat milk to the desired dry matter content. It is also possible to evaporate or filtrate wet destarched oats or the residual fraction from the production of oat milk to obtain semi-dry destarched oats having a dry matter content approximately between wet destarched oats and dry destarched oats.

In embodiments of the invention, wet destarched oats, dry destarched oats, or a mixture of both can be used.

Examples of suitable other plant protein products include protein products based on wheat, rice, potato, pea, soy, bean, faba bean, chickpea, lentil, algae, gluten, lupine, canola, sunflower seed, hemp, and their combinations. In one embodiment of the invention, the other plant protein product is based on pea, wheat, wheat gluten, soy, faba bean and/or algae, or any combinations thereof, typically combinations such as pea and algae, pea and wheat gluten, pea and faba bean, soy and faba bean, or wheat gluten and faba bean. In one embodiment, oat protein is excluded, i.e. the other plant protein product is other than oat protein. In a further embodiment of the invention, a microbial protein product may be used instead of or in addition to the at least one other plant protein product. Examples of microbial proteins are single cell protein, recombinant protein or another protein extracted from microbial origin.

In an embodiment, the other plant protein product has a protein content of at least 50%, preferably at least 55%, more preferably at least 60%, based on dry matter. Typically, the other plant protein product is in the form of a protein concentrate or protein isolate, and in some embodiments in the form of a protein texturate.

In one embodiment, the other plant protein product is selected from pea protein isolate, concentrate, and texturate; a soy protein isolate, concentrate, and texturate; faba bean isolate, concentrate, and texturate; sunflower seed protein isolate, concentrate and texturate; gluten flour and gluten texturate; and any combinations thereof.

In an embodiment of the invention, said at least one other plant protein product may thus be a texturized plant protein product. When destarched oats is mixed with said at least one other, texturized plant protein product, the method of the invention comprises heating or pressure-cooking the mixture without extrusion to obtain the food product.

Also other plant protein isolates, such as pea, soy, potato, wheat, or algae isolates may be added to the mixture comprising destarched oats and at least one texturized plant protein product before cooking. Destarched oats may be in wet or dry form or as a mixture or combination of both. Typically the level of dry destarched oats in such mixtures varies between 1-10%.

In an embodiment where destarched oats is mixed with at least one starch component other than oat starch to obtain a mixture of destarched oats and non-oat starch, said starch component is typically non-oat plant starch, for example barley starch, rice starch, corn starch, potato starch, wheat starch, cassava starch, pea starch, faba bean starch, or rye endosperm starch, typically rice starch or barley starch.

The mixture comprising destarched oats and non-oat starch is typically cooked by dry extrusion to starch-rich puffed extrudates, preferably with a short expansion die at the discharge end of the extruder. Destarched oats may be in wet or dry form or in combination of both. Typically, mixing wet and dry destarched oat is a suitable way to control the dough dry matter content. For example, a dough containing at most 20% of wet destarched oat and approximately 5 to 7% of dry destarched oat was found to result in a desirable puffed extrudate structure.

Cooking

In an embodiment, the method of the invention comprises a step of cooking the mixture of destarched oat and at least one other plant protein product, at least one plant starch other than oat starch, or both. Cooking refers here in particular to extrusion-cooking, hydrothermal cooking or pressure cooking.

Particularly in an embodiment, where the other plant protein product is in texturized form, i.e. a texturate, cooking comprises hydrothermal cooking or pressure cooking or heating, without extrusion.

Extrusion cooking can be performed using single-screw and twin-screw extruders and high-moisture extrusion (wet extrusion) or dry extrusion, as known to persons skilled in the art.

According to an embodiment of the invention, wet extrusion or high-moisture extrusion can be utilised to form the mixture comprising destarched oats and at least one other plant protein product to food products having a high moisture content and fibrous, non-expanded texture. In the extrusion process the above mentioned mixture is modified by pressure as well as by thermal and mechanical forces. These are created by heating of the extruder barrel and the shear of the screws. In an embodiment wherein a fibrous, non-expanded structure is desired, a long cooling die is preferably required in the end of the extruder, as illustrated in FIG. 1.

In one embodiment of the invention, the method comprises providing destarched oats, which is or consists essentially of a residue fraction or by-product from the production of oat milk; mixing said destarched oats with at least one other plant protein product other than oat protein to obtain a mixture of destarched oats and said at least one other plant protein product; and cooking the mixture by using wet extrusion-cooking or other hydrothermal treatment to form a texturized food product having a fibrous structure.

According to one embodiment of the invention, dry extrusion can be utilised to form the mixture comprising destarched oats and at least one other plant protein product to texturate food products, for example protein-rich texturate food products. In one embodiment, destarched oats is mixed with two other plant protein products.

In one embodiment, destarched oats is wet destarched oats. However, the wet destarched oats can be replaced with a respective amount of dry destarched oat without losing textured structure. In a further embodiment, mixtures of wet and dry destarched oats are used, which provides a suitable way to control the dry matter content of the dough.

According to another embodiment of the invention, dry extrusion can be used to form a mixture comprising destarched oat and at least one starch other than oat starch to low moisture content food products, such as expanded snacks, breakfast cereals, protein texturates or pasta, also known as extrudates. Typically these extrudates usually contain a relatively high amount of starch. The final moisture content of such starch-rich puffed extrudates after drying is typically less than 10%.

Examples of starch sources include cereal starches, such as barley starch, rice starch, wheat starch, rye endosperm starch, and corn starch, but also other starches such as potato starch, pea starch, faba bean starch and cassava starch.

Dry extrusion process uses similar process parameters as high-moisture extrusion to produce a viscoelastic melt in the extruder barrel. However, in dry extrusion the melt is forced through a short expansion die and this can cause the product to expand. The expansion is caused by residual water vaporising instantly from the melt due to sudden drop in pressure and in temperature. The expansion results in a crispy porous and fibrous product structure.

Typical process parameters both in wet extrusion and dry extrusion process include moisture content, temperature, pressure and shear forces. Different extruder setpoint temperatures and water feed rates can be used to vary the consistency of dough and melting temperature. Typically, barrel temperatures in an extrusion cooker vary between 100 and 200° C., preferably between 110 and 170° C. Melting temperatures of mixtures comprising destarched oats and at least one plant protein product are typically about 120-140 ° C., depending on the ingredients, on the applied temperature and the shear forces.

In some embodiments, pressure cooking or hydrothermal cooking can be used to form the texturized food product comprising destarched oats. Destarched oats in wet form (dry matter content 40-50%) or dry form (dry matter content 3-10%) is mixed with at least one other plant protein, which is in texturized form. Typically said at least one other plant protein product is a hydrated protein texturate, such as a hydrated protein texturate from pea, soy or wheat gluten. In addition to the textured plant protein product also other plant protein isolates in non-texturized form may be included in the food product, such as pea, soy, potato, wheat, or algae protein isolates.

In a further embodiment of the invention, the method comprises mixing destarched oats with at least one other plant protein product and at least one plant starch other than oat starch to obtain a mixture of destarched oats, at least one other plant protein and non-oat starch; and cooking the mixture by using hydrothermal cooking or extrusion-cooking to form the texturized food product. In said embodiment, the cooking step preferably comprises hydrothermal cooking or wet extrusion cooking.

Naturally, all textured food products according to the invention may comprise also spices, other protein and/or amino acid sources, vegetable fats, oils, emulsifiers, other vegetable ingredients and water as appropriate for the products in question. The method of the invention may thus comprise also steps of adding and mixing any of the above ingredients to the mixture before cooking. The method of the invention may also comprise recovering the texturized food product and processing it further to various food products, i.a. by using it as a texturized food ingredient.

A texturized food product according to the invention comprises a destarched oat fraction having a residual starch content of 10% or less, preferably 6% or less, more preferably 4% or less, even more preferably 3% or less, based on dry matter, together with at least one other plant protein product, with at least one starch component other than oat starch, or with at least one other plant protein product and at least one non-oat starch.

In an embodiment, said at least one other plant protein is other than oat protein.

Typically the texturized food product comprises the destarched oat fraction together with at least one other plant protein product other than oat protein or with at least one starch component other than oat starch.

In a preferred embodiment said at least one starch component other than oat starch is cereal starch component, typically barley starch or rice starch.

Typically the texturized food product according to the invention comprises 5-50%, preferably 10-50%, of destarched oats, based on dry matter of the texturized food product.

Examples of texturized food products according to the invention include but are not limited to expanded snacks, cereals, meat substitutes, protein texturates, ready-to-eat meals, and pasta products.

The invention is also directed to a texturized food product produced by the method of the invention.

When in the above embodiments the method or the product of the invention comprise "at least one" component or method step, they preferably contain two or three, more preferably two, of said components or method steps.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Experimental

Wet Extrusion

High-moisture wet extrusion experiments were done using a laboratory twin-screw extruder, equipped with a long cooling die (FIG. 1). Destarched oat (dry matter content 44%, starch content 3% and fiber content 15%, based on dry matter) was mixed with at least one other plant protein and fed into the extruder. Additional water was fed into the extruder separately. Different extruder setpoint temperatures and water feed rates (235-325 g/h) were tested to vary the dough consistency and melting temperature (134-144° C.).

The recipes and process parameters are listed in Table 1. The appearance and texture of the products was visually evaluated.

When a mixture of destarched oat and pea protein isolate was used in the extrusion (together with additional water), a textured food product having a desirable fibrous structure was obtained. When oat bran (containing 24% protein and 10-20% starch) was used instead of destarched oat, the resulting structure was too tight. A mixture of destarched oat and wheat gluten resulted in a textured product, but having an undesirably wet dough-like structure. Addition of small amount of algae protein into the destarched oat —pea protein mixture did not significantly influence the structure of the product.

TABLE 1

Wet extrusion experiments

| Experiment | Raw material 1 | Raw material 2 | Raw material 3 | Melting temperature ° C. | Water feed g/h | Dry matter feed g/h | Setpoint temperatures ° C. |
|---|---|---|---|---|---|---|---|
| 1 | destarched oat 50% | pea protein isolate 50% | — | 134 | 235 | 300 | 50/60/70/120/150/165/160/120 |
| 2 | destarched oat 50% | pea protein isolate 50% | — | 140 | 235 | 300 | 50/60/70/120/150/165/160/120 |
| 3 | destarched oat 47.5% | pea protein isolate 47.5% | algae protein 5% | 136 | 235 | 300 | 50/60/70/120/150/165/160/120 |
| 4 | destarched oat 45% | pea protein isolate 45% | algae protein 10% | 144 | 300 | 300 | 50/60/70/120/165/175/170/130 |
| 5 | destarched oat 50% | wheat gluten 50% | — | 135-140 | 235 | 300 | 50/60/70/120/150/165/160/120 |
| 6 | oat bran 50% | pea protein isolate 50% | — | 135 | 325 | 300 | 50/60/80/130/161/180/170/130 |

Dry Extrusion

Dry extrusion experiments were done with a laboratory scale twin-screw extruder, equipped with a short expansion die. Two types of dry end products were produced: starch-rich puffed extrudates and protein-rich texturates. A circular 3 mm expansion die was used for puffed extrudates and 8 mm expansion die for protein texturates. Destarched oat was tested in wet (dry matter content 43%) and dry form (dry matter content 95%). The appearance and texture of the products was evaluated by sensory analysis.

In the puffed extrudate experiments (Table 2), destarched oat was mixed with at least one cereal starch (barley or rice) and fed into the extruder. Extrudates with different expansion levels were obtained depending on the recipe and setpoint temperatures. Mixing wet and dry destarched oat was a suitable way to control the dough dry matter content. A dough containing max 20% of wet destarched oat +6% of dry destarched oat resulted in a desirable puffed extrudate structure. Increasing the level of dry destarched oat beyond this reduced puffing and resulted in somewhat hard structure.

TABLE 2

Dry extrusion experiments for puffed extrudates

| Experiment | Raw material 1 | Raw material 2 | Raw material 3 | Raw material 4 | Setpoint temperatures | Dry matter feed g/min | Water feed g/min | Screw speed rpm |
|---|---|---|---|---|---|---|---|---|
| 1.1 | wet destarched oat 25% | barley starch 75% | — | — | 110-100-90-80 120-110-95-80 | 66 | 0 | 315 |
| 1.2 | wet destarched oat 26% | barley starch 39% | rice starch 35% | | 120-110-95-80 110-105-90-85 | 75 | 0 | 315 |
| 1.3 | wet destarched oat 20% | dry destarched oat 6% | barley starch 37% | rice starch 37% | 110-105-90-85 | 66 | 0 | 315 |
| 1.4 | wet destarched oat 20% | dry destarched oat 16% | barley starch 32% | rice starch 32% | 110-105-90-85 | 66 | 0 | 315 |
| 1.5 | wet destarched oat 20% | dry destarched oat 26% | barley starch 27% | rice starch 27% | 110-105-90-85 | 66 | 0 | 315 |

In the protein texturate experiments (Table 3), destarched oat was mixed with two other plant protein raw materials (pea, wheat, soy or faba bean) and fed into the extruder. Different extruder setpoint temperatures and water feed rates were tested. A mixture of 30% wet destarched oat (dry matter content 47%), faba bean protein concentrate and protein isolate from pea or soy resulted in a very good textured structure. The wet destarched oat could be replaced with a respective amount of dry destarched oat in the recipe without losing textured structure.

TABLE 3

Dry extrusion experiments for protein texturates

| Experiment | Raw material 1 | Raw material 2 | Raw material 3 | Setpoint temperatures | Dry matter feed g/min | Water feed g/min | Screw speed rpm |
|---|---|---|---|---|---|---|---|
| 2.1 | wet destarched oat 30% | wheat gluten 30% | pea protein isolate 40% | 160-145-110-85 | 75 | 10 | 95 |
| 2.2 | wet destarched oat 40% | wheat gluten 25% | pea protein isolate 35% | 160-145-110-85 | 75 | 0 | 95 |

TABLE 3-continued

Dry extrusion experiments for protein texturates

| Experiment | Raw material 1 | Raw material 2 | Raw material 3 | Setpoint temperatures | Dry matter feed g/min | Water feed g/min | Screw speed rpm |
|---|---|---|---|---|---|---|---|
| 2.3 | wet destarched oat 30% | faba bean protein concentrate 35% | pea protein isolate 35% | 160-145-110-85 | 75 | 0 | 95 |
| 2.4 | wet destarched oat 30% | faba bean protein concentrate 35% | soy protein isolate 35% | 160-145-110-85 | 75 | 10 | 95 |
| 2.5 | wet destarched oat 40% | faba bean protein concentrate 30% | soy protein isolate 30% | 140-130-110-85 | 75 | 5 | 95 |
| 2.6 | dry destarched oat 21% | faba bean protein concentrate 40% | soy protein isolate 40% | 140-130-110-85<br>150-130-110-85 | 75 | 25 | 95 |
| 2.7 | wet destarched oat 30% | wheat gluten 35% | faba bean protein concentrate 35% | 140-130-110-85 | 75 | 25 | 95 |

Pressure Cooking

Pressure cooking expertiments were done using a pilot scale continuous cooker equipped with a screw. Destarched oat in wet (dry matter content 43-47%) or dry form (dry matter content 95%) was mixed with at least one other plant protein, typically a hydrated protein texturate from pea, soy or wheat gluten (Table 4). In addition, plant protein isolates (pea, soy, potato, wheat or algae), vegetable fats, water and in some cases spices and other vegetable raw materials were added. The level of dry destarched oat in recipes varied between 1-8%. Pressure cooking of the mixture resulted in a textured product. Use of destarched oat instead of oat bran had a positive impact on the structure and bite of the product.

TABLE 4

Pressure cooking experiments

| Raw material | Experiment 1 | Experiment 2 | Experiment 3 | Experiment 4 |
|---|---|---|---|---|
| Dry destarched oat | 8% | 5% | 4% | |
| Wet destarched oat | | | | 10% |
| Oat bran | | | | 5% |
| Textured pea protein | 22% | 18% | | 13% |
| Textured soy protein | | | 18% | |
| Potato protein isolate | 6% | 4% | 6% | 4% |
| Sweet potato | | | 4% | |
| Pea protein isolate | 4% | 3% | 3% | 3% |
| Wheat gluten | | 8% | 3% | 7% |
| Psyllium | 0.7% | | | |
| Apple fibre | 0.6% | | | |
| Salt | 0.7% | 0.7% | 0.7% | 0.8% |
| Rapeseed oil | 4% | 3% | 3% | 3% |
| Water | 54% | 59% | 59% | 51% |

Preparation of Pasta

Figure 2:
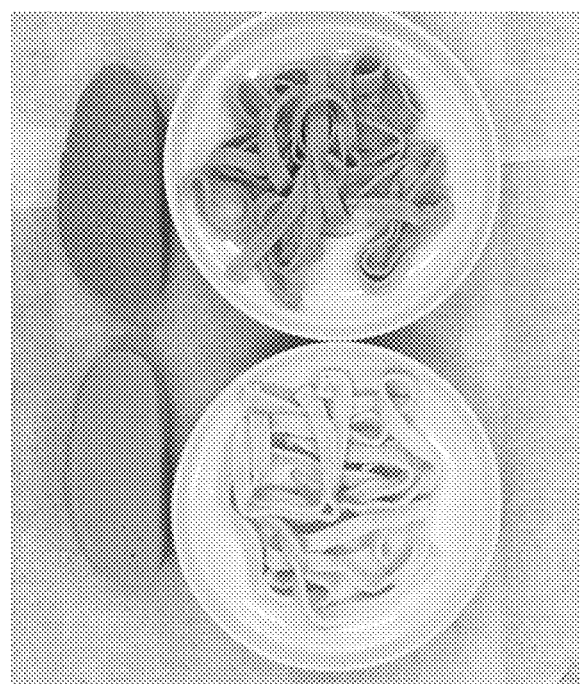
FIG. 2 illustrates pasta with destarched oat (top) and reference pasta (bottom).

Pasta experiments were performed at laboratory scale using a kitchen pasta roller. 10% of the durum wheat flour in a fresh pasta recipe was replaced with destarched oat. This resulted in a fresh pasta with good cooking properties, taste and mouthfeel, but a darker colour than in the reference fresh pasta (FIG. 2). Based on the experiment, addition of destarched oat is a suitable way to increase protein and fibre content of pasta.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in food industry, particularly in the manufacture of plant-based products that find use as meat substitutes, breakfast cereals, and pasta, to name a few.

CITATION LIST

Patent Literature

WO 2017/064172 A1
WO 2018/115595 A1
WO 2018/189161 A1
WO 2018/19866 A1
WO 02/067698 A1
WO 2010/140963 A2
WO 2017/093538 A1

The invention claimed is:

1. A method for producing a texturized food product, comprising the steps of:
   mixing an oat fraction having a starch content of 6% or less and a fiber content of at least 5%, based on dry matter, with:
   a) at least one other plant protein product to obtain a mixture of the oat fraction and the at least one other plant protein; or
   b) at least one plant starch other than oat starch (non-oat starch) to obtain a mixture of the oat fraction and the non-oat starch; or
   c) at least one other plant protein product and at least one plant starch other than oat starch (non-oat starch) to obtain a mixture of the oat fraction, the at least one other plant protein, and the non-oat starch; and
   cooking the mixture obtained by the mixing by hydrothermal cooking or extrusion-cooking to form the texturized food product.

2. The method according to claim 1, wherein the oat fraction has a starch content of 4% or less, based on dry matter.

3. The method according to claim 1, wherein the oat fraction has a protein content of at least 20%, based on dry matter.

4. The method according to claim 1, wherein the oat fraction comprises a residue fraction or by-product from the production of oat milk, oat beverages, or a liquid oat base.

5. The method according to claim 4, wherein the residue fraction or by-product has a dry matter content of 15-50% (wet form) or 90-97% (dry form), and wherein the dry form is obtained by flash-drying or mill drying the wet form of the residue fraction or by- product from the production of oat milk.

6. The method according to claim 1, wherein the at least one other plant protein product is selected from the group consisting of protein products based on wheat, rice, potato, pea, soy, bean, faba bean, chickpea, lentil, algae, gluten, lupine, canola, sunflower seed, hemp and their combinations, wherein the at least one other plant protein product has a protein content of at least 50%, based on dry matter, and wherein the at least one other plant protein product is in the form of a protein concentrate, protein isolate, or protein texturate.

7. The method according to claim 1, wherein the at least one other plant protein product is selected from the group consisting of a pea protein isolate, concentrate, and texturate; a soy protein isolate, concentrate, and texturate; a faba bean isolate, concentrate and texturate, a sunflower seed protein isolate, concentrate and texturate; a gluten flour and gluten texturate; and any combinations thereof.

8. The method according to claim 1, wherein the cooking is done by extrusion-cooking, and wherein the extrusion-cooking comprises wet extrusion or dry extrusion.

9. The method according to claim 1, wherein the method comprises providing an oat fraction, which consists essentially of a residue fraction or by-product from the production of oat milk; mixing said oat fraction with at least one other plant protein product other than oat protein to obtain a mixture of the oat fraction and said at least one other plant protein product; and cooking the mixture of the oat fraction and said at least one other plant protein product using wet extrusion-cooking or hydrothermal cooking to form a texturized food product having a fibrous structure.

10. The method according to claim 1, wherein the extrusion is performed by using an extrusion cooker having a barrel temperature of 100-200° C.

11. The method according to claim 1, wherein said at least one other plant protein product is a texturized plant protein product.

12. The method according to claim 11, wherein the method comprises mixing the oat fraction with said texturized plant protein product and heating or pressure-cooking the mixture to obtain the texturized food product.

13. The method according to claim 1, wherein said at least one starch other than oat starch is selected from the group consisting of barley starch, rice starch, corn starch, potato starch, wheat starch, cassava starch, pea starch, faba bean starch, and rye endosperm starch.

14. The method according to claim 4, wherein the residue fraction or by-product has a dry matter content of 90-97%.

* * * * *